US008615312B2

(12) United States Patent
Colombo et al.

(10) Patent No.: US 8,615,312 B2
(45) Date of Patent: Dec. 24, 2013

(54) METHOD FOR ORCHESTRATING SERVICES OF A SERVICE-ORIENTED AUTOMATION SYSTEM AND ORCHESTRATION MACHINE

(75) Inventors: Armando Walter Colombo, Karlstein (DE); Joao Marco Mendes, Ponte de Lima (PT); Paolo Leitao, Braganca (PT)

(73) Assignee: Schneider Electric Automation GmbH, Sligenstadt (DE)

( * ) Notice: Subject to any disclaimer, the term of this patent is extended or adjusted under 35 U.S.C. 154(b) by 638 days.

(21) Appl. No.: 12/739,311

(22) PCT Filed: Oct. 24, 2008

(86) PCT No.: PCT/EP2008/064470
§ 371 (c)(1),
(2), (4) Date: Jul. 14, 2010

(87) PCT Pub. No.: WO2009/053472
PCT Pub. Date: Apr. 30, 2009

(65) Prior Publication Data
US 2010/0292810 A1    Nov. 18, 2010

(30) Foreign Application Priority Data
Oct. 26, 2007   (DE) .......................... 10 2007 051 683

(51) Int. Cl.
G05B 15/02   (2006.01)
G05B 19/418   (2006.01)

(52) U.S. Cl.
USPC ..................................... 700/9; 703/13; 700/96

(58) Field of Classification Search
USPC ............... 700/9, 29, 96; 703/22, 13
See application file for complete search history.

(56) References Cited

U.S. PATENT DOCUMENTS

2006/0015315 A1*  1/2006  Colombo et al. ............... 703/22

OTHER PUBLICATIONS

Mendes et al. "Service orieneted process control using high level Petri nets" IEEE Conference on Industrial Informatics Daejeon Korea Jul. 13-16, 2008, pp. 750-755.*
Bepperling et al "A Framework for Development and Implementation of Web Service-Based Intelligent Autonomous Mechatronics Components", IEEE Industrial Informatics, 2006, pp. 341-347.
Lettao et al "Petri Net Based Methodology for the Development of Collaborative Production Systems" IEEE Emerging Technologies and Factory Automation 2006, pp. 819-826.
Jammes "Service-Oriented Device Communications Using the Device Profile for Web Services", Internet Citation, 2005, XP-002509060.
Mendes et al "Service-Oriented Control Architecture for Reconfigurable Production Systems" IEEE Industrial Informatics, 2008, pp. 744-749.

* cited by examiner

Primary Examiner — Sean P. Shechtman
Assistant Examiner — Steven Garland
(74) Attorney, Agent, or Firm — Ladas & Parry LLP

(57) ABSTRACT

A method for orchestrating services of a service-oriented automation system (SOAS), system components (SMC, LCC) offering services (S, WS) that represent the functionality thereof and requesting services (S) of other system components (SMC, LCC), the behavior of the automation system (SOAS) being controlled by the orchestration of the services (S) of the system components (SMC, LCC) using an orchestration machine (OE), and to an orchestration machine for orchestrating services of a service-oriented automation system (SOAS). In order to achieve an orchestration of services at a device level, it is provided that the orchestration machine (OE) uses high-level Petri nets tailored to service-oriented systems and the orchestration of the services (S) at the device level is performed by interpretation and execution of various HLPN models, which represent the behavior of the automation system (SOAS) and/or the system components (SMC, LCC).

4 Claims, 3 Drawing Sheets

# METHOD FOR ORCHESTRATING SERVICES OF A SERVICE-ORIENTED AUTOMATION SYSTEM AND ORCHESTRATION MACHINE

BACKGROUND OF THE INVENTION

The invention relates to a method for orchestrating of services of a service-oriented automation system, with system components offering services representing their functionality and services querying other system components, with the behavior of the automation system being governed by orchestration of the services of the system components by means of at least one orchestration machine and to an orchestration machine for orchestrating of services of a service-oriented automation system, comprising system components like intelligent mechatronic components, control components and/or decision components (DSC), each of which provides a set to services which represents their internal functionalities and is queried by other system components.

One method for orchestration of a service-oriented automation system and an orchestration machine is described in an article by F. Jammes, H. Smith et al.: "Orchestration of service-oriented manufacturing processes," IEEE 2005, vol. 1, pages 617 to 624. A typical feature of a service-oriented automation system is that various processes are compiled and executed to form a complex process of higher order. This pattern is repeated at various levels, namely composition of field devices for formation of machines, compositions of machines for formation of work cells and work paths, composition of machine-level processes for formation of fabrication systems and plants. As soon as the process is compiled as a complete ecosystem of services, it is desirable that the complexity linked with the coordination of atomic services assigned to the processes is encapsulated in a single service interface.

The practice of sequential and synchronized execution of services related to a closed business or fabrication process is called orchestration in the technical vocabulary. An orchestration machine implements the application logic that is necessary to orchestrate atomic services and proves a high-level interface for the combined services (processes).

The combining and orchestrating of web services has attained especial significance in recent times. In this connection, a goal is pursued of forming complex processes by combination of web services that are applicable via multiple hierarchical levels.

To provide flexibility, it is recommended that a web services orchestration description (model-based orchestration) be used, which describes the operational sequences of the modeled system. These orchestration descriptions can be interpreted in real time by machines which interpret the operational sequence in real time, to avoid the use of ad-hoc, hard-coded implementations.

At present, principally two specifications for orchestration of web services are known, one being the Business Process Management Language (BPML), the other the Process Specification Language (PSL), especially for representation of fabrication processes.

In industry, however, the Business Process Execution Language for Web Services (BPEL4WS) has often been used, which is also known under the abbreviations WS-BPEL or BPEL.

However, one disadvantage of orchestration machines obtainable currently is that they are designed for enterprise-level systems. These implementations run on top of an application server and occupy storage areas around 10 MB. For service coordination at the device level, the orchestration machine must in fact run in an embedded device with limited resources.

SUMMARY OF THE INVENTION

A published work by A. Bepperling et al., "A framework for development of web service based on intelligent autonomous mechatron components," in Industrial Informatics 2006, IEEE International Converence on IEEE PL., Aug. 1, 2006, pages 341-347, describes the orchestration of production-process-depicting services base on an overall production process at the business level.

A model describing the production process, especially Petri net mode II, is divided into the building blocks participating in the production process and interpreted from them. An orchestration depicting the production steps occurs already before implementation of the model. The procedure described of the individual system-component-depicting services is not suited for an orchestration of functionalities.

The published work by P. Leitao et al., "Petri-net-based methodology for the development of 15 collaborative production systems," Emerging Technologies and Factory Automations, 2006, ETFA '06, Sep. 1, 2006, pages 819-826 describes a method to develop collaborative, agent-based production systems using high-level Petri nets. The proposed method supports the development of life cycles from specification analyses to design validation and implementation of collaborative and reconfigurable production systems and their control systems.

In the published work by F. Jammes, "Service-oriented device communications using the device profile for web services," Internet Citation, Dec. 2, 2005, the adaptation of service-oriented architectures at the level of communication between embedded devices is described, which offer their functionalities. The use of device profiles for web services for architectures of intelligent devices is also described.

Based on this, the problem that is the basis for the current invention is to further develop a method for orchestration of a service-oriented automation system and an orchestration machine in such a way that it is compact and can be run at the device level.

The problem is solved according to the invention among other things by the features of claim 1.

Service-oriented automation systems relate to distributed and reconfigurable automation systems, whose behavior is governed by the orchestration of services, with system components such as manufacturing components, intelligent decision mechanisms and control devices, which offer services that make available their automation functionalities as service, and are queries by other components.

Services are orchestrated at the device level via computing units as in microcontroller-integrated orchestration machines which use a type of high-level Petri nets (HLPN) tailored to service-oriented systems, which function as HLPN interpreters or as an installed auto-run-capable HPLN control module, for execution of HLPN models which depict their behavior. For this, preferably provision is made that the orchestration machine is integrated in a computing unit like the microcontroller of a system component like a mechatronic component and/or a logic control component, and that the HLPN model of the automation system is interpreted and listed by the orchestration machine.

Additionally, the procedure is distinguished in that the orchestration machine is integrated in a computing unit of a control component at the device level like the gripper of a robot or parts of a transport system at the machine level like a set of devices, especially a robot or complete transport mechanism and/or at the cell level like a set of machines that form a complete manufacturing or assembly system, and that a previously compiled HLPN model of the automation system is executed in the control component.

Preferably the Petri net is described via XML, which can be interpreted via the control mechanism of the device or compiled through out-of-network guidance and then can be loaded onto the device.

In connection to interpretation or compilation, the Petri net description is converted into data structures, preferably in the form of matrices, which can be manipulated by the program for control of the service and I/O level.

Preferably the description also includes which services are made available or queries, read or written to the I/Os, and the analysis information actuated for the Petri net.

In addition, the problem is solved by an orchestration machine with the features of claim 6.

Additionally, the invention relates to the field of industrially distributed control and defines an orchestration machine for orchestration of services, at the device level, in service-oriented-based automation systems.

The orchestration machine uses a type of high-level Petri nets (HLPN) tailored to service-oriented systems, with the advantage of its high-performance mathematical basis made use of to represent dynamic, distributed and event-oriented systems in which simultaneity and parallelism, synchronization, resource sharing, non-synchronized exchange of events and mutual inhibition are decisive.

Preferably an orchestration machine is implemented at the device level, especially into a control or computation unit of a controller like the microcontroller of the device. The orchestration machine preferably has a modular design and can execute and interpret various Petri net models, with the behavior of the device being depicted. For simpler devices, the high-level Petri net model, due to hardware limitations, can preferably be integrated directly into the control. The orchestration machine can be designed as an HLPN control module capable of running automatically in a computing unit like a microcontroller, PLC or IPC of a system component, for executing the HLPN models of the automation system. Additionally, provision is made that a control system comprises a logical control component and/or a decision component and/or a mechatronic component, which are linked with each other via a communication network, with the orchestration machine for coordination and aggregation of services of additional components embedded in the logical control component, and with the orchestration machine knowing the HLPN model of the automation system.

The orchestration machine can be implemented in a controller of a device, i.e., at the device level, if this device contains more than one service and the services must be orchestrated.

Additionally, a prerequisite for implementation is that the device contains a corresponding infrastructure, i.e., a data processing unit like a microcontroller.

Preferably, the mechatronic component as well as the logical control component has a logical controller, which is defined as an HLPN interpreter, to orchestrate services at the device level. A simpler component may comprise pre-compiled HLPN nets instead of an HLPN interpreter.

As an alternative, an orchestration machine may also be implemented in a controller of a device, i.e. at the device level. With this, the machine comprises multiple devices which offer the functionalities as services which must be orchestrated. The machine itself also must contain a hardware infrastructure in the form of a data processing unit like a microprocessor, PLC or IPC.

Additionally, the orchestration machine can be implemented in a controller of a complete manufacture and/or assembly system. In this case, the system consists of multiple machines, with manufacture and/or assembly functions of the machines being offered as services that must be orchestrated. A further prerequisite is that the manufacturing and/or assembly system has hardware infrastructure in the form of a computer unit like a microcontroller, PLC or IPC.

One additional preferred embodiment form may contain the system of multiple orchestration machines, with multiple orchestration machines integrated at a control level of the device (device level), at a control level of the machine (machine level) and/or at a control level of the system (system level).

If the orchestration machine services are orchestrated at the machine level, one of these services orchestrated by an orchestration machine could be the orchestration of a subset of services of a subset of devices. For the then-superior orchestration machine there is only one service to orchestrate, namely the service that is offered by another orchestration machine.

The invention differs especially from prior art in that an orchestration machine is implemented into a controller at the device level, for example integrated into a gripper of a robot or into a drive of a transport system, since the requisite computing capacity is present in the form of computing units like a microcontroller at the device level.

The simpler or the smaller the automation devices displaying the computing units that have the computing capacity, the simpler the orchestration can be carried out at the device level.

BRIEF DESCRIPTION OF THE DRAWINGS

Further particulars, advantages and features of the invention are gleaned not only from the claims for these features to be gleaned by themselves and/or in combination, but also from the following description of preferred embodiment examples to be extracted from the drawings.

Shown are.

DESCRIPTION OF THE PREFERRED EMBODIMENTS

Figure 1:
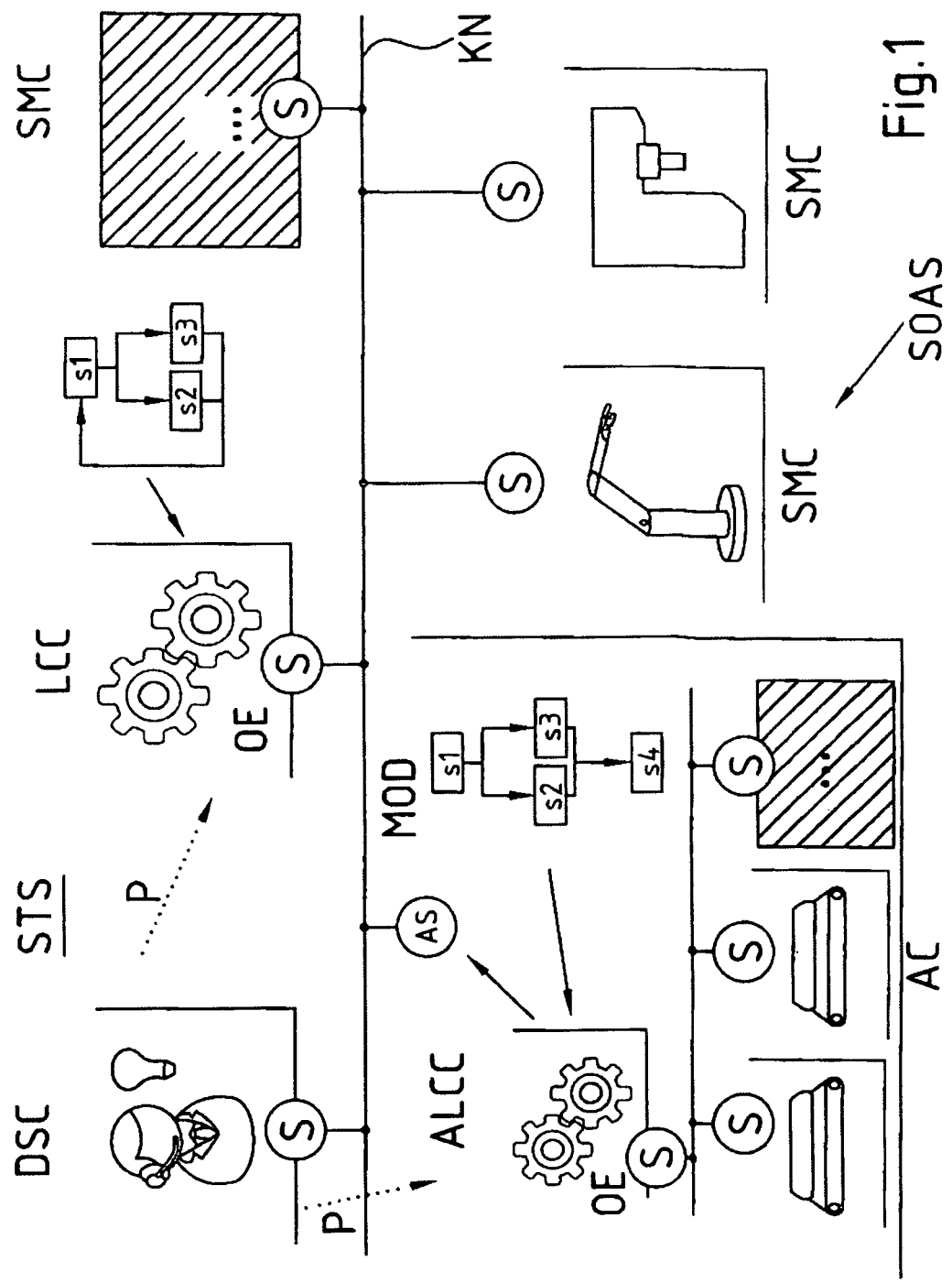
FIG. 1: a control system for service-oriented automation systems.

FIG. 1 shows a control system 10 of a service-oriented automation system SOAS, comprising intelligent mechatronic components, assembled components AC, logical control components LCC and decision components DSC, which are connected with each other via a communication network KN and call network services via this or make them available.

The basis for the proposed control approach for the service-oriented automation system SOAS depicted in FIG. 1 is the design of a reconfigurable automation system, based on modular and simple mechatronic devices SMC, each of which makes available a set of services S, which represent their internal functionalities. All interaction processes between the SMC, LCC and DSC components occur via the access to services S, which are linked through the communication network KN.

The control of the service-oriented automation system SOAS is mainly dependent on the coordination of the distributed mechatronic devices SMC and other components in the system. In the case of the mechatronic devices, this includes the orchestration of their services S and also the coordination and synchronization of their I/Os.

The control itself can be differentiated as a local control LC via the mechatronic components SMC, the logical control components LCC as a collaborative control between components and an assembled control ALCC using special control services AS, usually for formation of higher-level services based on individual services.

The control system STS according to FIG. 1 principally shows three types of components which participate in the control. The logical control components LCC offer coordination control services if the individual and coordinated behavior is insufficient. This should function as a client and in a position to use its services S, without hypotheses of how these are implemented. Additionally this is yet another provider, since it can carry out the function of generating assembled services AS of higher levels that consist of individual ones.

An orchestration machine OE pertaining to this, which carries out the coordination and aggregation of services S, should be embedded in the LCC, with the entire artificial model MOD being known to it as an HLPN model of the production system.

In addition to the static controller LCC, which principally carries out a special logical or processing plan, the flexibility can be expanded by decision mechanisms. The decision itself can be made locally through the SMC and LCC components, or through the use of special decision components DCS for complex global behavior. For this purpose, the LCC control checks the decision finding components DSC that offer special services S, to select one of multiple options, as is indicated by the arrows P. Also it can force non-detected procedures into unforeseen states. An LCC and a DSC can be integrated as one component, which supplement one another, and operate together by exchange of services.

Figure 2:
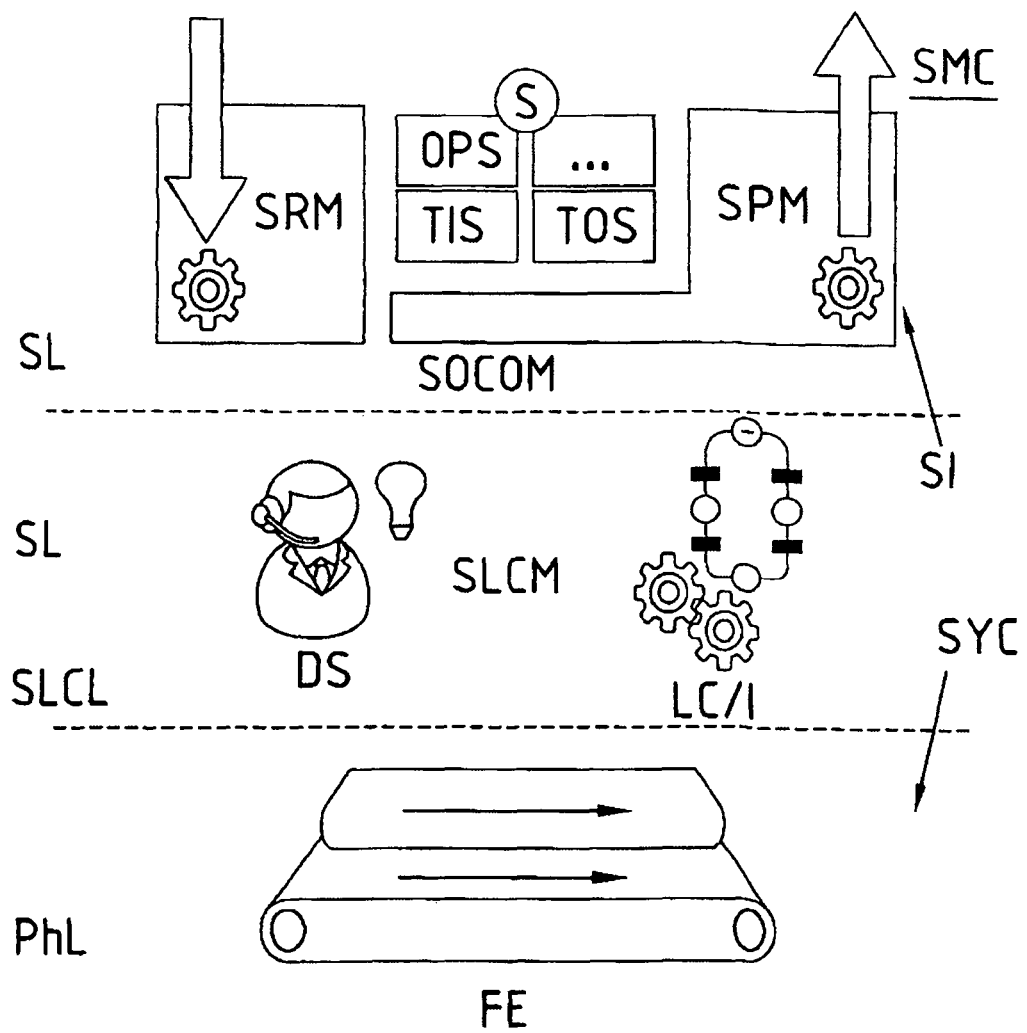
FIG. 2: a concept model of smart mechatronic components

The mechatronic devices SMC, also designated as Smart Mechatronic Components, control their own behavior and can easily be combined to for more complex devices AC, which, combined with other devices, form the desired automation system. The mechatronic components SMC represent the integrated combination of device, control and communication. An SMC is structured into three different levels, as depicted in FIG. 2: a physical level PHL, a smart logical control level SLCL and a service level SL. The heart of the SMC is the smart logic control module SLCM, which comprises a logical control LC and optionally a decision-maker DS. The smart logical control module SLCM controls the internal behavior of the physical device SMC and coordinates the communication via services S. In the logical control module SLCM, service interfaces SI are implemented. Additionally, I/Os of the physical level are synchronized via an interface SYC. Services like ON position OPS, Transfer IN TIS, or Transfer OUT TOS are requested via a service request unit SRM and offered via a service preparation unit SPM. A communication module SOCOM is configured in a service-oriented way.

Each SMC must encapsulate services S which the physical device SMC or the smart logical control can make available. Since these components include the concepts of the service-oriented systems, a technological solution depicts the usage of web services WS, in order to make them dialogue-capable. Web services WS are simple, economical, very widely obtainable interactional media between information systems. On the other hand, electronic devices are connected to an increasing degree with standard networks, with Ethernet and TCP/IP being very widely obtainable at many locations. A device profile DPWS for web services WS defines expansions which are necessary to use web services WS in electronic devices, with their specific limit conditions being allowed for: space specification (footprint), making available and fulfilling the most customary requirements, such as security, immediate operational readiness, asynchronous and event-oriented exchange.

An approach exists to define the logical control LC of SMC and LCC as an integrated interpreter I, to instrument services S at the device L, which handle a type of high-level Petri nets HLPN, which are tailored to service-oriented systems. Simpler devices can include already pre-compiled HLPN instead of an interpreter I, since the logic and communication themselves do not have to be altered during the run time.

It is important to point out that other control mechanisms can be used parallel via various devices. The condition is that communication via web services should ensure compatibility and that the logical control mechanisms used, in the present case Petri nets, must have access to the service-level DPWS, to use the facilities and to be capable of communicating with other components in the system.

The HLPN-based logical control machine or orchestration machine OE is embedded in microcontroller devices, with them carrying out the logical control behavior of the automation device or system. The machine OE can be integrated in an independent LCC or directly into the SMeCs for collaboration purposes. The machine carries out the logical control behavior of the LCC or SMC components, depicted via HLPN models, with the implementation of the services S being coordinated (and/or I/Os as per the level of granularity) which are made available through the components.

Figure 3:
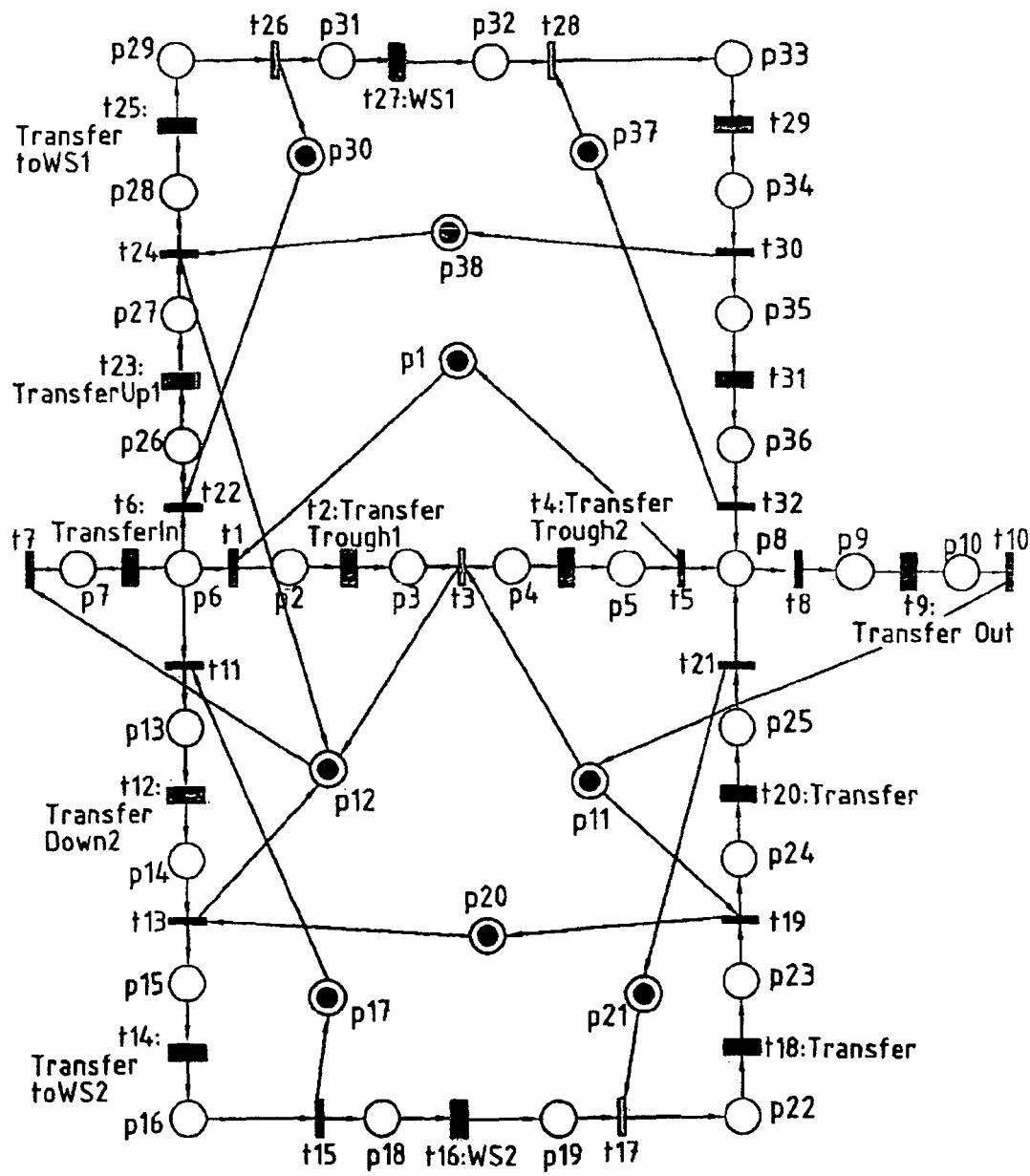
FIG. 3: an HLPN model of a feed system with two work stations

The approach uses HLPN as a description of control logic for several reasons:

The advantage of their high-performance mathematical basis to represent discrete, dynamic, distributed and event-oriented systems in which simultaneity and parallelism, synchronization, resource sharing, unsynchronized exchange of events and mutual exclusion are essential Facilities complex in graphic modeling and comprehension High-performance and effective control mechanism, since HLPN is to be depicted internally as a set of matrices and manipulated Capability for adaptation of interfaces to I/Os and services through the description of transitions Activating and synchronizing the run-time behavior of components Coverage of conflicts that require a decision Validation, analysis and simulation in the draft phase, with the results of this phase being able to be used for support of the decision mechanisms Modular depiction, connectivity and aggregation of sub-models Transparence: modules can be programmed in various methodologies, since the interaction pattern is defined and mutually form a standard pattern Application Examples Development of a control module for an automated feeding device, with reference to FIGS. 2 and 3.

Taken into account is the example of a feed unit FE with Transfer In and Transfer Out services TIS, TOS for connection with other feed units or transport systems, and an On- Position service OPS for displaying that a product such as a palette is at a place to be used by a machine or an operator. Said services are made available by the SMC and can be used by other components, but if needed, also external services may be consulted, such as that the Transfer Out service of the other feed unit must be queried to connect with other feed units.

In an initial phase, the HLPN model which depicts, edits, analyzes and simulates the behavior of the automation device, with a suitable high-level Petri net tool being used. As explained above, the automatic services run via a high-level Petri net control machine OE, but other forms of control mechanisms can also come into use. It depends on the developer or engineer, as to which available control machine is to be used, as long as it has the interface SI to the service level SL and thus permits compatibility.

Then the HLPN model is downloaded to the microcontroller MC, which then is interpreted and carried out by the HLPN machine OE, which is already embedded in the microcontroller device. The services orchestrate execution of the HLPN model by the machine OE as per the special behavior, with the service S made available via the SMC components being summoned. The system is easily and quickly able to be reconfigured and is only needed to alter the HLPN module, which depicts the new behavior of the automation device or system.

The invention claimed is:

1. Method for orchestration of services of a service-oriented automation system, with system components offering services depicting their functionality and querying services of other system components, with the behavior of the automation system being controlled through orchestration of the services of the system components using an orchestration machine,
   characterized in that the orchestration machine is modular and is implemented respectively in the system components as a High-Level-Petri-Net interpreter, or as an auto-run-capable High-Level-Petri-Net control module, and uses High-Level-Petri-Nets tailored to service-oriented systems, and that the services are orchestrated at a device level by coordination and aggregation of the services from the system components by the High-Level-Petri-Net interpreter or the auto-run-capable High-Level-Petri-Net control module by interpretation and execution of High-Level-Petri-Net models depicting the behavior of the system components.

2. Method according to claim 1, characterized in that the orchestration machine is integrated into a computing unit of the system components.

3. Method according to claim 1, characterized in that the High-Level-Petri-Nets are described via extended markup language.

4. Method for orchestration of services of a service-oriented automation system, with system components offering services depicting their functionality and querying services of other system components, with the behavior of the automation system being controlled through orchestration of the services of the system components using an orchestration machine,
   wherein the orchestration machine is modular and is implemented respectively in the system components as a High-Level-Petri-Net interpreter, or as an auto-run-capable High-Level-Petri-Net control module, and uses High-Level-Petri-Nets tailored to service-oriented systems, and that the services are orchestrated at a device level by coordination and aggregation of the services from the system components by the High-Level-Petri-Net interpreter or the auto-run-capable High-Level-Petri-Net control module by interpretation and execution of High-Level-Petri-Net models depicting the behavior of the system components, and
   characterized in that linked to interpretation or compilation, High-Level-Petri-Net description is converted into data structures in the form of matrices.

* * * * *